United States Patent [19]

Conibear

[11] 4,128,961

[45] Dec. 12, 1978

[54] ACTUATOR FOR ANIMAL TRAP

[75] Inventor: Frank Conibear, Victoria, Canada

[73] Assignee: Woodstream Corporation, Lititz, Pa.

[21] Appl. No.: 762,660

[22] Filed: Jan. 26, 1977

[30] Foreign Application Priority Data

Feb. 27, 1976 [CA] Canada .................................. 246769

[51] Int. Cl.² .......................................... A01M 23/26
[52] U.S. Cl. ............................................ 43/88; 43/90
[58] Field of Search ................................ 43/88, 90-97

[56] References Cited

U.S. PATENT DOCUMENTS

| 409,468 | 8/1889 | Kelley | 43/88 |
|---|---|---|---|
| 2,564,811 | 8/1951 | Mak | 43/90 |
| 3,760,531 | 9/1973 | Conibear | 43/90 |

FOREIGN PATENT DOCUMENTS 16116 of 1894 United Kingdom ........................ 43/90

Primary Examiner—N. P. Godici
Attorney, Agent, or Firm—Holman & Stern

[57] ABSTRACT

An actuator for a rotating frame animal trap. The actuator comprises two arms spring biased at one end to tend to move the other ends of the arms outwardly. Each arm terminates in a ring that is adapted to encircle adjacent frames of the trap. The ring on each arm is inclined out of the longitudinal axis of the arm, towards the other ring on the other arm. The actuator is easy to make and provides excellent squeezing power where that power is required.

6 Claims, 5 Drawing Figures

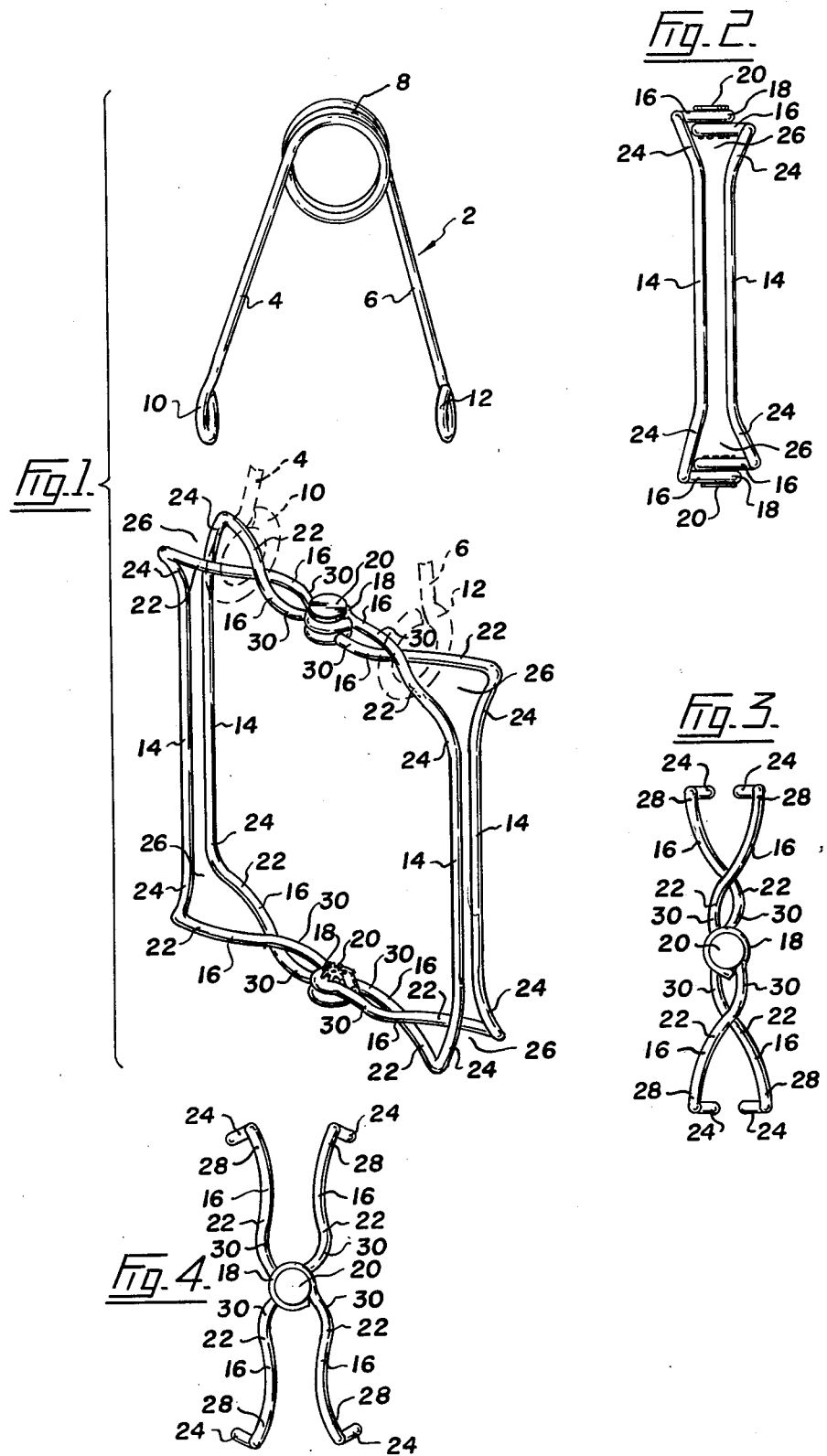

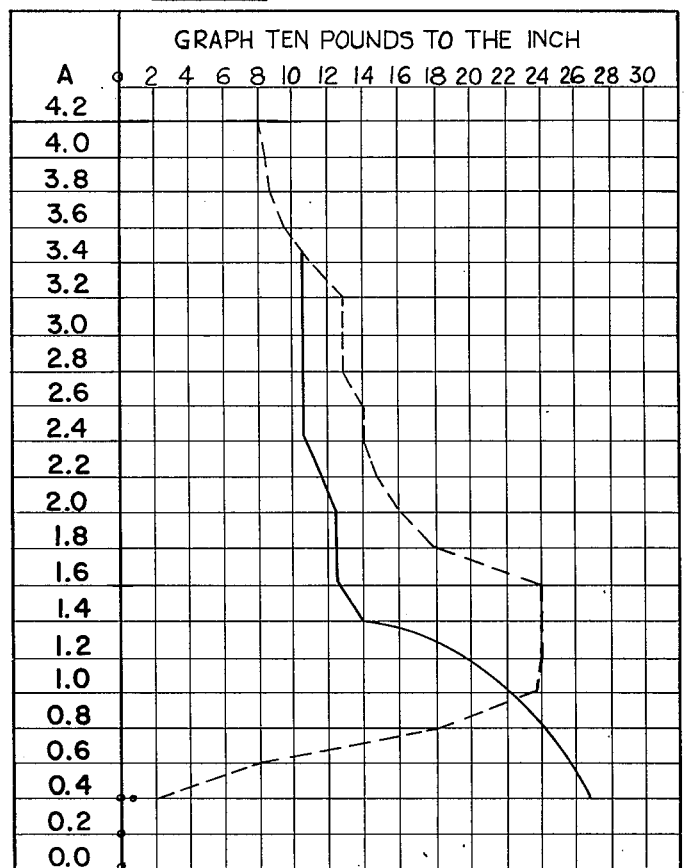
Fig. 5.
GRIPPING POWER ON DIFFERENT THICKNESS OF PLYWOOD
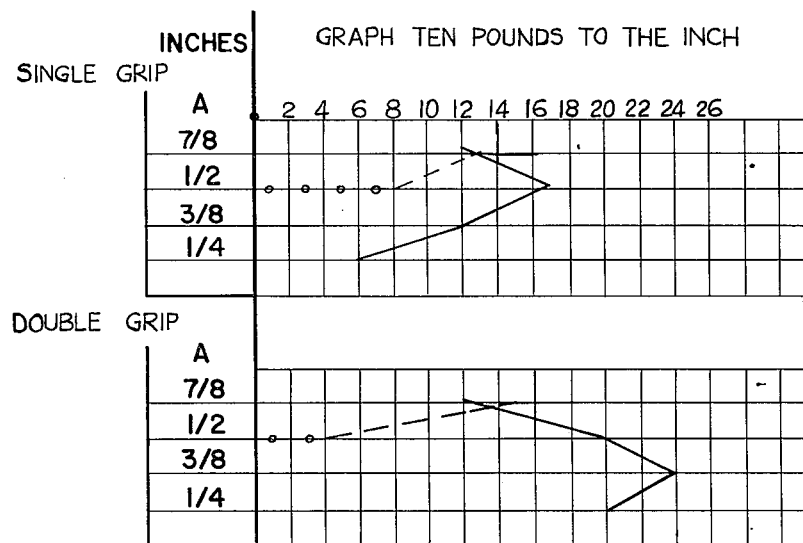

ACTUATOR FOR ANIMAL TRAP

This invention relates to animal traps and, in particular, to an actuator useful with a rotating frame animal trap.

Rotating frame animal traps are well known. The traps are gaining increasing acceptance, as in contrast to leg-hold traps the rotating frame traps kill the animal humanely. The ideal rotating frame trap kills the animal instantly upon trapping. The leg-hold trap simply holds the animal until it starves or freezes to death or is killed by the trapper.

Rotating frame animal traps each comprise a pair of similar frames pivotally connected at adjacent ends for relative rotation on a common axis. The sides of the frames form two pairs of co-acting jaws. The animal is killed by being trapped between the jaws. The jaws come together with such force that in many cases the internal organs of the animal are crushed and death occurs instantly. The traps are provided with triggers. Actuation of the trigger causes the trap to move from the set or open position to the closed position. The movement is carried out by an actuator. Some rotating frame traps have two actuators but, generally, one actuator is sufficient. These actuators are usually made of round wire stock and consist of arms spring biased at one end so that the other ends, if unobstructed, would move away from each other to a distance substantially greater than the width of the frames of the trap. Each arm terminates in a ring that is adapted to encircle one set of adjacent ends of the frame. Thus, the actuator urges the jaws towards the closed position and maintains them in that position.

In order that a rotating frame trap be effective, that is, in order that the trap kills the trapped animal as quickly as possible, it is necessary that there be considerable squeezing power at the end of the actuator runs. It has been a disadvantage with certain prior art rotating frame traps that they loose squeezing power in the final closing stages. Unfortunately this is exactly where the greatest squeezing power is needed in order to ensure rapid death of the trapped animal. A number of inventions have been made to the rotating frame trap in order to avoid this disadvantage. Many of these inventions are effective but they do usually suffer from the disadvantage that fairly extensive modifications of the basic rotating frame trap is required. By basic rotating frame trap we mean, for example, a trap as described and claimed in my U.S. Pat. No. 3,010,245 issued on Nov. 28, 1961. Furthermore, it has been a feature of the development work carried out on rotating frame traps that the curing of one problem has introduced other problems. These problems have included a loss of power from the actuator and a tendency for the actuator to move over the ends of the trap and onto the jaws, thus drastically reducing the effectiveness of the trap. Another disadvantage is that the improved traps become specific in the types of animals that they can catch. Thus, an improvement may restrict a trap to usefulness with either a bulky bodied animal or with a slim bodied animal.

A further point is that all the improvements have meant increased cost of manufacture of the trap. This extra cost is not of great importance with animals having valuable pelts but most of the fur-bearing animals, for example, muskrats and squirrels, do not have expensive pelts. Thus quite a small increase in the cost of the trap is undesirable to the trapper.

Accordingly, the present invention seeks to provide a trap that is cheap to make and is extremely effective, particularly in ensuring that adequate squeezing power exists at the end of the actuator runs.

According to one aspect, the present invention is in an actuator for a rotating frame animal trap, the actuator comprising two arms spring biased at one end to tend to move the other ends of the arms outwardly, each arm terminating in a ring that is adapted to encircle adjacent frames of the trap and is the improvement in which the ring on each arm is inclined out of the longitudinal axis of the arm, towards the other ring on the other arm.

In another aspect the present invention is in an animal trap having two similar frames made of round wire stock, each frame having jaw-forming sides that lie in a common plane and ends extending therebetween to support said jaws, said ends each having a central portion in which the frames are pivotally connected through adjacent ends for rotation about a common axis between set and closed positions, and outer portions on each side of the central portion extending to said jaws, trigger means for releasably maintaining the trap in a set position and at least one actuator capable of rapidly and forcefully effecting such rotation, said actuator having two arms spring biased at one end so that the other ends, if unobstructed, would move apart to a distance substantially greater than the width of said frame ends, each arm terminating in a ring adapted to encircle adjacent ends of both frames on opposite side of said axis, and is the improvement comprising each actuator ring being inclined out of the longitudinal axis of the arm upon which the ring is carried towards the other ring on the other arm.

The actuator according to the present invention is simple to produce from existing actuators. A simple bending in of the acutator rings is sufficient so that in the set position of the trap the rings are inclined towards each other. The amount of bending in of the actuator ring is such that when the jaws of the trap are tightly closed, with nothing in the trap, the actuator rings at the end of each arm of the actuator are substantially parallel to each other.

The inclination of the actuator rings in the present invention helps to transfer power from the early closing stages of the jaws—where very little power is required because during these stages the jaws have not come in contact with the animal—to the later stages of closing where the power is needed. It will be shown later that peak power is reached at narrow separation of the jaws, a feature difficult to obtain with the prior art traps.

In a preferred embodiment of the animal trap according to the invention, the upper part of at least one of the jaws in pairs of co-acting jaws of the trap are outwardly flared to form a wedge shaped opening between the coacting jaws when closed.

In a further preferred embodiment the ends of the adjacent frame ends encircled by the actuator rings are bent slightly outwardly in open, set position so that, in the final stages of closing of the trap these frame ends offer less resistance to the actuator rings as they close over the end portions of the frame ends.

The ends of the frame consist of two non-collinear sections connected by a third, offset section, which section forms an obtuse or right angle with each of the two non-collinear sections. The pivotal connection of the frame is in this offset section. In the trap according to the present invention the offset section should be of sufficient length to provide space between oppositely urged sections of the frame ends, when the trap is in open set position, to accommodate the inclined actuator rings.

The invention is illustrated, by way of example, in the accompanying drawings in which:

FIG. 1 is an exploded view of part of a trap according to the present invention;

FIG. 2 is a side view of the frame of the trap of FIG. 1;

FIG. 3 is a plan view of the end member of the trap of FIG. 1;

FIG. 4 is a plan view of the trap of FIG. 1 but in the open, set position; and

FIG. 5 illustrates the results achieved using the trap according to the present invention.

FIG. 1 illustrates a rotating frame animal trap but the trigger mechanism that is always used on such traps and the safety mechanism that is usually used have been omitted in the interests of clarity of illustration. In fact any trigger useful with rotating frame traps can be used.

The illustrated trap comprises an actuator 2 comprising arms 4 and 6 spring biased at 8, that is at one end, to tend to move the other ends of the arms 4 and 6 outwardly. Arm 4 terminates in a ring 10; arm 6 terminates in a ring 12. FIG. 1 illustrates that rings 10 and 12 are inclined out of the longitudinal axis of their respective arms 4 and 6 towards each other.

The actuator 2, like the remainder of the trap, is made of round wire stock.

The illustrated trap comprises two similar frames each having jaw-forming sides 14 that lie in a common plane and ends 16 extending between the sides 14 to support the jaws. The ends 16 each have a central portion 18 at which the frames are pivotally connected by rivets 20 for rotation between a set and a closed position. The position shown in FIG. 1 is just before complete closing of the sides 14 under the influence of the actuator 2, the rings 10 and 12 of which are shown in dotted outline on the frame part of FIG. 1.

Ends 16 each have outer portions 22 on each side of the central portion 18.

In the illustrated embodiment and particularly as illustrated in FIG. 2, the end parts of the sides 14 are flared outwardly at 24 to form a wedge-shaped opening 26 between the co-acting jaws 14 that is especially apparent when the jaws are closed. FIG. 2 shows the jaws slightly open. Thus, FIG. 2 illustrates that the sides 14 comprise a portion parallel to the axis of rotation and end portion 24 flared away from the axis of rotation. Each flared portion form an acute angle with the upper frame end 22 to which it is joined.

As illustrated most clearly in FIG. 3 the outer portions 22 of the adjacent frame ends 16 encircled by the actuator rings 10 and 12 are bent slightly outwardly at 28 when in open, set position as illustrated in FIG. 4. FIG. 3 illustrates the outer portions 22 when the trap is in the near-closed position, that is when the trap has been moved from the set position shown in FIG. 4 under the influence of the actuator towards the near-closed position as illustrated in FIG. 3. However, for convenience of illustration, the trap is not shown completely closed in FIG. 3. The effect of the shaping 28 is to ensure that in the final stages of closing of the trap the frame ends offer less resistance to the actuator rings 10 and 12 as they close over the outer portions 22 of these frame ends.

As illustrated in FIG. 4, the ends 16 of the frames consist of two non-collinear outer portions or sections 22 joined by a third offset section 30. The offset section 30 forms an obtuse or a right angle with each of the two non-collinear sections 16. The pivotal connection 20 is in the offset section. The offset section 30 is of sufficent length to provide space between oppositely urged sections of the frame ends when the trap is in the open position as illustrated in FIG. 4 to accomodate the rings 10 and 12. The offset must be greater than with a conventional rotating frame trap because in the open, set position, the inclined actuator rings 10 and 12 touch at the bottom and will diverge outwardly. Extra space is therefore needed to accommodate this diverging.

FIG. 5 illustrates the results achieved using the trap illustrated in the remaining Figures. The upper part of FIG. 5 compares the results achieved with a trap according to the present invention with those of a standard production model of a trap available under the trade mark Victor-Conibear which is in accordance with the claims of U.S. Pat. No. 3,010,245. Column A sets out the separation of co-acting jaws in inches and the horizontal axis represents the squeezing power of the jaws. Experiments have revealed that in the closing stages the "C" position for the actuator produces better results so that all the results used for comparison are taken in this way. In the graphs the dash lines give the results with the prior art traps. The solid lines give the results obtained with the trap according to the present invention. It must be emphasized that the important part of the graph is that occurring at one inch and below and, in particular, at about 0.6 inches. It is clearly noticable that all the real squeezing power with the prior art traps finishes at 0.6 inches. After this separation of the jaws all the squeezing power is caused by the thrust of the actuator which, because of its shape, is forcing itself forward. However, this force is not an adequate force to kill an animal. No matter what the pressure at a separation of 0.6 inch or less the jaws can be opened somewhat by pulling against them until they are separated to about 0.6 inch at which point the genuine squeezing power of the actuator will come in. This means that the breathing of a trapped animal could expand the width of the space between the jaws to about 0.6 inch thus permitting the animal to live although in considerable pain.

However, the solid line demonstrates clearly that the trap according to the present invention starts to produce its best results at a jaw separation of about 0.8 inches which then increases to a squeezing pressure of about 26 pounds at 0.4 inches.

The lower part of FIG. 5 is a means of confirming the gripping power and is carried out by measuring the grip exerted on differing thickness of plywood of the same width. And the horizontal axis represents gripping power. The dotted line graphs are once more for prior art type traps and the solid line graph for the presently described trap. Again the results in the gripping comparison are taken with the actuator at approximately right angles. To test the gripping power, one end of a piece of plywood is placed in a trap, either one pair of jaws gripping the plywood, as in the upper column of the bottom part of FIG. 5 or the two pairs of cooperating jaws gripping as in the bottom section of FIG. 5. One side of the trap is then attached to a spring balance. The stick is pulled away from the spring balance and the pull required to move the stick towards the person pulling is shown in pounds. The pull varies with the different size stick as is clear from the graph. Again the graph illustrates clearly that the trap according to the present invention exerts excellent gripping power at narrow separation of the jaws.

The present invention therefore provides a trap that produces excellent squeezing power exactly where it is required, namely when the jaws are close to each other. Despite this, the trap is cheap to produce and, in fact, the expense over an unmodified trap, for example a trap as described and claimed in U.S. Pat. No. 3,010,245 is negligible.

The inclination of the rings means that when the actuator is extended, as shown in FIG. 1, the rings are very close to 90° to the end members and thus have greater squeezing power than if inclined to the end members as in prior art traps.

Further the rings will not slip over the jaws, for example if the caught animal is smaller than the trap is designed for or if the caught animal is caught by only one set of jaws. If the rings slip over the jaws the squeezing power is lost, a fact well known in the art.

I claim:

1. An animal trap having two similar frames made of round wire stock, each frame having jaw-forming sides that lie in a common plane and ends extending therebetween to support said jaws, said ends each having a central portion in which the frames are pivotally connected through adjacent ends for rotation about a common axis between set and closed positions, and outer portions on each side of the central portion extending to said jaws, and at least one actuator capable of rapidly and forcefully effecting such rotation, said actuator having two arms spring biased at one end so that the other ends, if unobstructed, would move apart to a distance substantially greater than the width of said frame ends, each arm terminating in a ring adapted to encircle adjacent ends of both frames on opposite sides of said axis, each actuator ring being inclined towards the other ring of the other arm in said set position of the trap and said rings having a substantially parallel relationship when said actuator forces said frames into a closed position.

2. An animal trap as claimed in claim 1 in which the upper part of at least one of the jaws in pairs of coacting jaws of the trap are outwardly flared to form a wedge-shaped opening between the co-acting jaws when closed.

3. An animal trap as claimed in claim 1 in which each of said sides comprises a lower portion parallel to the axis of rotation and an upper portion flared away from the axis of rotation, this upper portion forming an acute angle with the upper frame end to which it is joined.

4. An animal trap as claimed in claim 1 in which the ends of the adjacent frame ends encircled by the actuator rings are bent slightly outwardly in open, set position whereby, in the final stages of closing of the trap, these frame ends offer less resistance to the actuator rings as they close over the end portions of the frame ends.

5. An animal trap as claimed in claim 1 in which the ends of the frames consist of two non-collinear sections connected by a third, offset section, which section forms an obtuse or a right angle with each of the two non-collinear sections, the pivotal connection of the frame being in this offset section, the offset section being of sufficient length to provide space between oppositely urged sections of the frame ends, when the trap is in open, set position, to accommodate the inclined actuator rings.

6. An animal trap having two similar frames made of round wire stock, each frame having jaw-forming sides that lie in a common plane and ends extending therebetween to support said jaws, said ends each having a central portion in which the frames are pivotally connected through adjacent ends for rotation about a common axis between set and closed positions, and outer portions on each side of the central portion extending to said jaws, and at least one actuator capable of rapidly and forcefully effecting such rotation, said actuator having two arms spring biased at one end so that the other ends, if unobstructed, would move apart to a distance substantially greater than the width of said frame ends, each arm terminating in a ring adapted to encircle adjacent ends of both frames on opposite sides of said axis, each actuator ring being inclined towards the other ring of the other arm, when the trap is in set position and being substantially parallel to the other ring of the other arm when the trap is in closed position, the upper part of at least one of the jaws in pairs of co-acting jaws of the trap being outwardly flared to form a wedge shaped opening between the co-acting jaws when closed, the ends of the adjacent frame ends encircled by the actuator rings being bent slightly outwardly in open, set position whereby, in the final stages of closing of the trap, these frame ends offer less resistance to the actuator rings as they close over the end portions of the frame ends and in which the ends of the frames of two non-collinear sections connected by a third, offset section, which section forms an obtuse or a right angle with each of the two non-collinear sections, the pivotal connection of the frame being in this offset section, the offset section being of sufficient length to provide space between oppositely urged sections of the frame ends, when the trap is in open, set position, to accommodate the inclined actuator rings.

* * * * *